Feb. 10, 1931.  C. W. ARMBRUST  1,792,056
LIFE SAVING WATER MAKING TWIN CUP
Filed Jan. 11, 1927  2 Sheets-Sheet 1
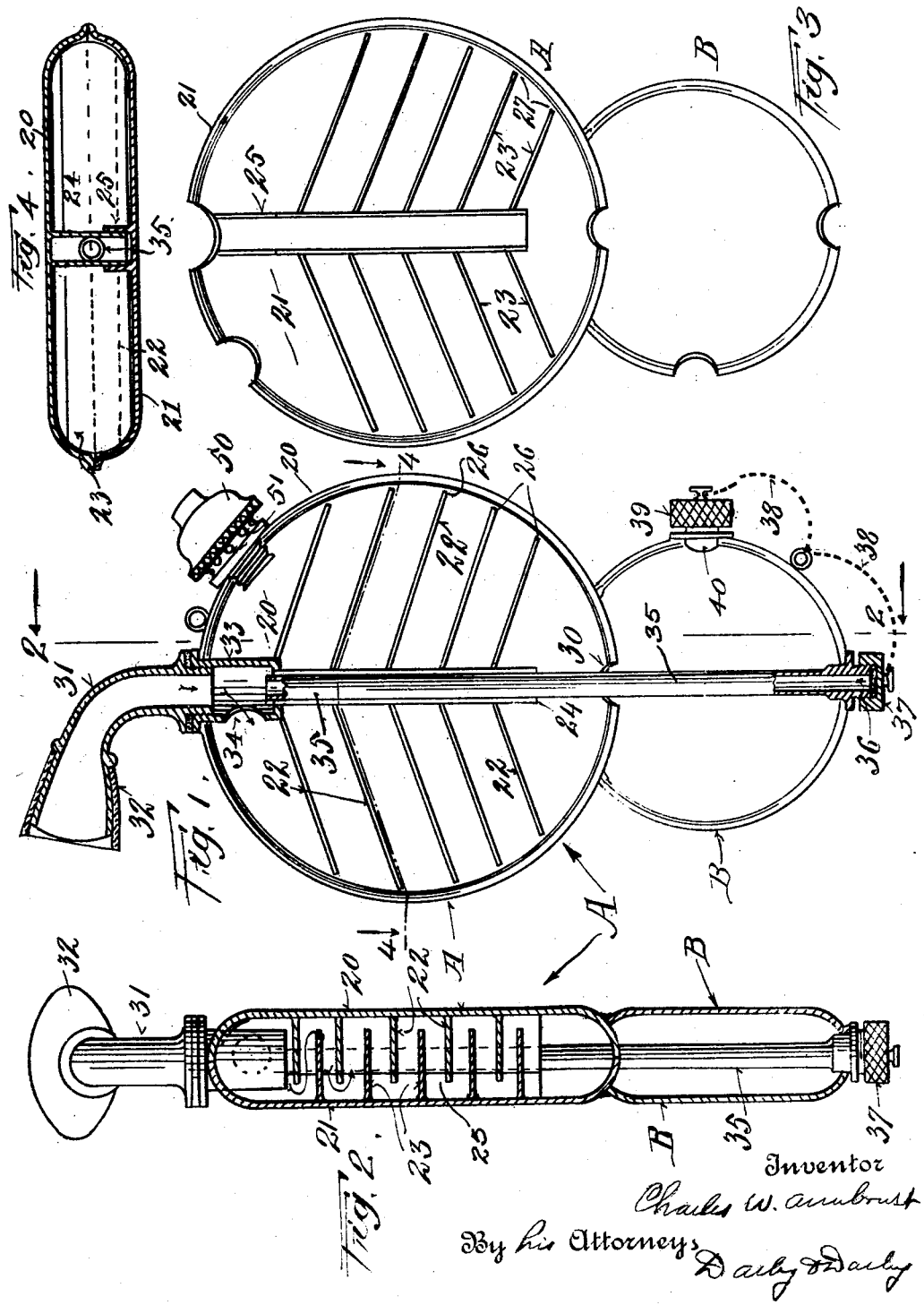

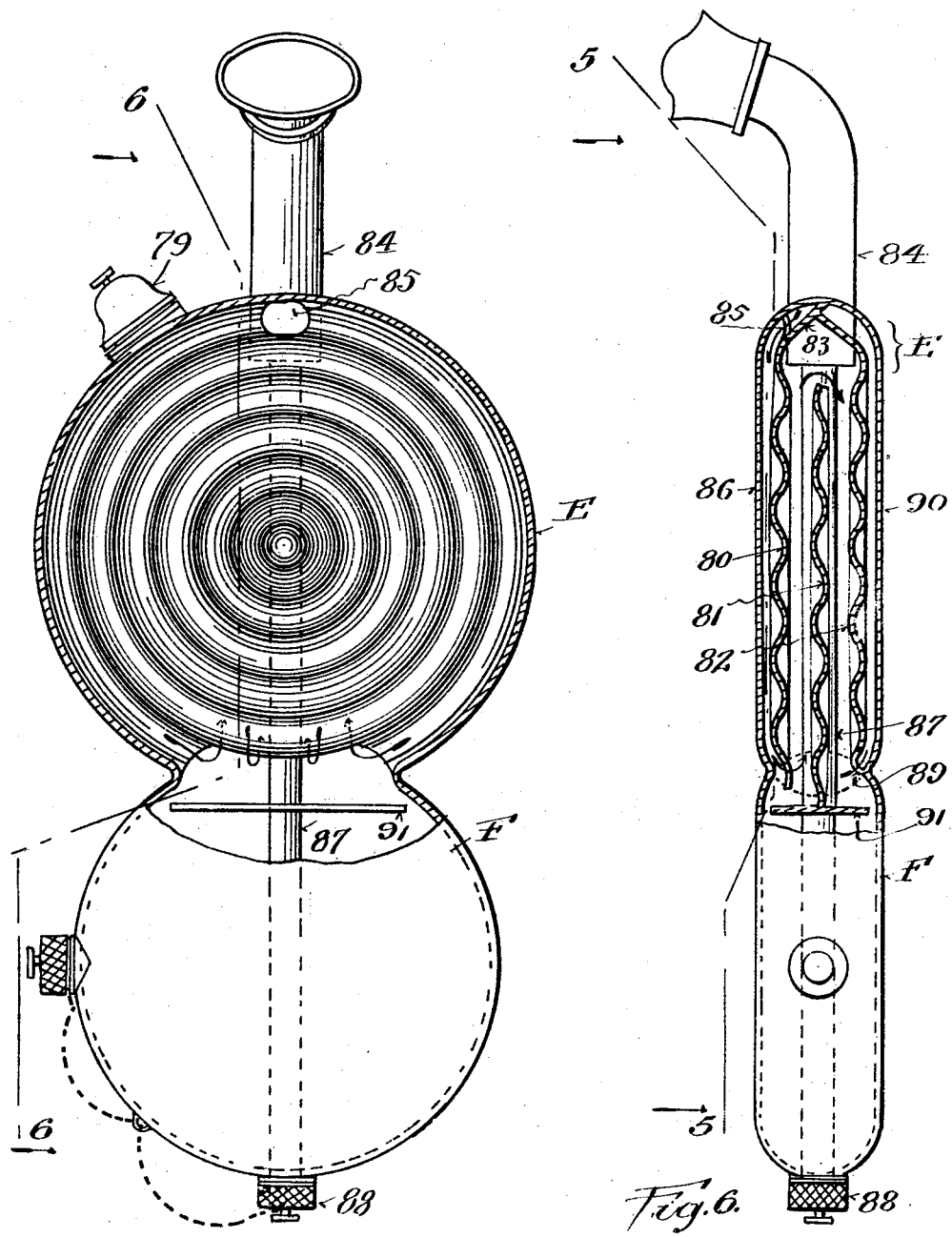

Patented Feb. 10, 1931

1,792,056

UNITED STATES PATENT OFFICE

CHARLES W. ARMBRUST, OF MIDDLETOWN, NEW YORK, ASSIGNOR TO INTERNATIONAL LIFE SAVING WATER MAKING CUP CORPORATION, OF WASHINGTON, DISTRICT OF COLUMBIA, A CORPORATION OF DELAWARE

LIFE-SAVING WATER-MAKING TWIN CUP

Application filed January 11, 1927. Serial No. 160,497.

This invention relates to life saving apparatus in the form of a moisture condensing and water collecting device of the twin cup type, and has for its object the provision of a simple, efficient and convenient cup construction whereby the moisture of the exhaled breath is condensed and collected in a separate cup for use in emergencies as in cases of shipwreck, in desert places or wherever conditions are likely to cut off the supply of drinking water.

Another object includes the provision of a construction wherein the moisture condensing elements are arranged and contained in a separate compartment from which the collected moisture is allowed to drain into the twin water-holding compartment. A further object of this invention includes a construction which will float in water. My construction is further compact, durable and provided with a reservoir for holding water which can be drunk. I further provide a construction which is readily attached to a life-saving belt, and which has means for separating the saliva from the condensing and condensed water.

Other objects will appear hereinafter and I attain these objects by the construction illustrated in the accompanying drawings in which, Fig. 1 is a view of my improved device with the complementary cover of Fig. 3 removed.

Fig. 2 is a view taken on the line 2—2 of Fig. 1 with the complementary part of Fig. 3 in place.

Fig. 3 is a view of the complementary part or cover of the condensing compartment, and the water holding compartment shown in Fig. 1.

Fig. 4 is a view taken on the line 4—4 of Fig. 1, when the complementary part of Fig. 3 is in place, and Figs. 5 and 6 are views taken respectively on the lines 5—5 of Fig. 6 and 6—6 of Fig. 5.

The same numerals refer to like parts throughout the several views.

It is known that breath leaving the body of a person is saturated, that is, it contains all the moisture that it can hold at the body temperature, which normally is a little over 98 degrees F. Experiments show that at body temperature the amount thus given off by the average healthy individual is from 12 to 20 ounces in every twenty-four hours. In cases of shipwreck or in desert places with no drinking water, the condensed water obtained from respired breath would, therefore, make a difference between life and death.

It is the prime purpose of my invention to utilize and make available to the greatest extent, the moisture content of respired air for shipwrecks or the like. To this end, I provide twin cup construction (A, B) which is provided with means for receiving and passing respired air with ease, so as not to obstruct breathing, while at the same time the moisture content is most effectively separated and finally collected in the separated twin cup (B) from which it is readily obtained for drinking. In order to extract the moisture, as completely as possible, I provide a large condensing surface, so arranged and constructed as will expose the respired air to the best advantage. In a preferred form of construction, my improved cup comprises a large breath receiving and condensing compartment or twin cup (A) having integrally attached thereto the water receiving compartment or reservoir (B) usually of smaller capacity. These cups or compartments are preferably flattened to thereby provide, not only for quick cooling, but also for easy storage in life belts and the like. To the inner walls of the opposite sides 20 and 21 of cup A, there are attached the condensing fins 22 and 23. Fins 22 are soldered or otherwise secured to walls 20 and to the central partition 24 while fins 23 are similarly secured to wall 21 and the central partition 25. In other words the transverse partition 24—25 shown in Fig. 4 is composed of two portions, a double walled portion 24 attached to side 20 which telescopes with a double wall 25 attached to side 21. The outer ends 26 and 27 of all the fins are spaced from the wall of the cup, so as to permit free passage of condensed moisture from the fins which slope from the center outwards, see Figs. 1 and 3. The condensing compartment A communicates with the reservoir B by an aperture 30 to permit the condensed water to collect in the reservoir. The partition plates 24 and 25 interlock and form an air tight partition wall, thereby dividing the cup chamber into two separate compartments.

As is best shown in Figs. 1 and 2, a breathing tube 31, having a mouth piece 32 is suitably fastened to a holding member or sleeve 33 in cup A. Sleeve 33 is provided with an outlet 34 for allowing free passage of the breath into and through the condensing chambers. This sleeve is also in direct communication with the saliva collecting tube 35 which extends through both cups A and B, and is secured in cup B by suitable means as by solder or by welding. The open end 36 of this tube is closed by a suitable screw cap 37 which is held by a guard chain 38. A similar screw cap 39 on the water outlet tube or tap 40 permits water to be drawn as required in emergencies. The condensing cup is also supplied by an egress valve 50 for free outward passage of the moisture deprived air through the outlets 51.

In Figs. 5 and 6, I have shown a disk type of twin-cup construction (E, F), wherein corrugated disks 80, 81 and 82 serve as moisture condensing plates within cup E. Plate 80 has an extension 83, which is connected with the lower part of the respiration tube 84. This tube has a breath outlet 85 for admitting the breath into the space formed by the baffle 80 and the cup wall 86. A cut-out sector portion at the lower part of plate 80 permits free passage of the breath to the inner compartment formed between plates 80 and 81. Plate 81 carries, mid-way, the saliva tube 87, which extends from the lower end of tube 84 to the outlet 88 in cup F. This plate has a cutaway part at the top whereby breath is permitted to enter from the second compartment between plates 80 and 81 to the third compartment between plates 81 and 82. Plate 82 is sealed at the top (and sides), and has a cutaway portion in the lower part at 89, through which breath enters the final chamber between plate 82 and the rear outer wall 90. From this chamber the breath escapes into the open air through the valve 79. The corrugations of plates 80, 81 and 82 afford better condensing surfaces, and the condensed water is collected in the reservoir cup F. A thin plate 91 is carried on the saliva tube 87. This plate is thin and flexible, and in a preferred form of construction, it is soldered or welded on the saliva tube, and thus serves as a breakwater to keep the condensed water in the reservoir cup, and to prevent it from being blown out through the valve.

In the constructions described herein, by way of illustration merely, the moisture laden breath enters on one side of the cup or compartment and passes back and forth, or in and out in a tortuous passage, over the moisture condensing plates which are arranged to be most effective in quickly condensing and collecting the moisture. Breath is thus deprived of its moisture in a most efficient manner and the condensed water thus collected and used in emergencies may mean a difference of life and death.

Having now described my invention, what I claim as new and useful and desire to secure by United States Letters Patent is:

1. A moisture condensing and water collecting device comprising interconnected compartments, one of said compartments having condensing devices arranged symmetrically and in duplicate.

2. A moisture condensing and water collecting device comprising interconnected compartments, one of said compartments having condensing devices in duplicate and means for supplying moisture laden breath to one of said duplicated parts and removing said moisture deprived breath from the other of said duplicated parts.

3. In a moisture condensing twin-cup, for separating and collecting moisture from respired breath, a condensing compartment and a water receiving compartment interconnected, means for sub-dividing said condensing compartment into a plurality of symmetrical parts and means in said condensing compartment for separating moisture from the breath as it passes through said compartment.

4. In a moisture condensing twin-cup for separating and collecting moisture from respired breath, a condensing compartment and a water receiving compartment interconnected, means for sub-dividing said condensing compartment into separate parts, a plurality of moisture condensing obstructions in each of said parts, whereby the passing breath is deprived of its moisture which is directed into the water receiving compartment.

5. In a device for extracting moisture from respired breath, a breathing tube and a saliva tube extending from said breathing tube, one of said tubes having an outlet for the exhaled breath, a compartment through which said saliva tube extends, moisture condensing plates in said compartment, disposed in the pathway of the breath.

6. In a device for extracting moisture from respired animal breath, a breathing tube and a saliva tube extending from said breathing tube, a condensing cup through which said saliva tube extends, moisture condensing plates extending from opposite sides of said tube and arranged for causing moisture laden breath to come in contact first with the plates on one side of said tube, and then with the plates on the other side of said tube.

7. In a device for extracting moisture from respired animal breath, a breathing tube and a saliva tube extending from said breathing tube, a condensing cup through which said saliva tube extends, moisture condensing plates extending from opposite sides of said tube and arranged for causing moisture laden breath to come in contact, first, with the plates on one side of said tube, and then with the plates on the other side of said tube, for condensing said moisture and means for collecting said condensed water from said condensing cup.

8. In a device for extracting moisture from respired animal breath, a breathing tube and a saliva tube extending from said breathing tube, a condensing cup through which said saliva tube extends, moisture condensing plates in the form of fin plates extending from opposite sides of said tube, said plates forming a group of moisture condensing means on opposite sides of said tube.

9. A twin-cup for condensing and collecting water from a flowing stream of respired breath, one of said twins serving as a moisture condensing cup and the other as a reservoir for the condensate, and a breath supplying tube and a breath escaping device on one of said twin-cups.

10. A twin-cup for condensing and collecting water from a flowing stream of respired breath, one of said twins serving as a moisture condensing cup and the other as a reservoir for the condensate, a breath supplying tube and a breath escaping device on one of said twin-cups, said tube and device disposed side by side at one end of the cup, for causing the stream of the breath to divest itself of its moisture before being liberated to the open air.

11. In a cup for condensing moisture and collecting said condensed moisture as water obtained from respired breath, a pair of inter-united cups, one of said cups having a breath receiving and a breath discharging device, members in said cup serving as a dividing means and division plates extending from said members in opposite directions for causing moisture from the respired breath to be condensed on said plates in constantly decreasing quantities as the breath proceeds through said cup.

12. A device for obtaining the moisture from respired breath, comprising means for separating the saliva from the breath and the moisture condensed from the breath and including plates for causing said saliva freed breath to pass through tortuous passages, means for taking off condensed moisture at different points in said passage, and means for confining said moisture to prevent its loss with the escaping breath.

In testimony whereof I have hereunto set my hand on this 3rd day of January, A. D., 1927.

CHARLES W. ARMBRUST.